Figure 6:
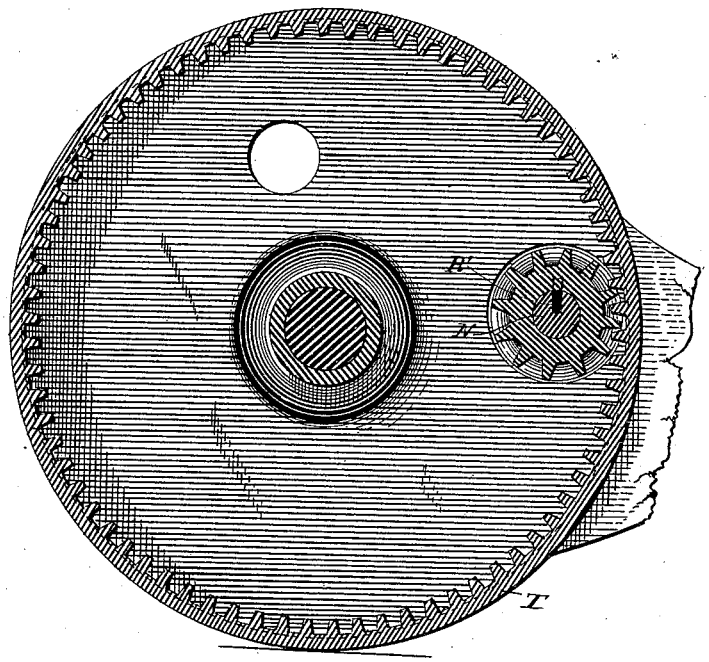

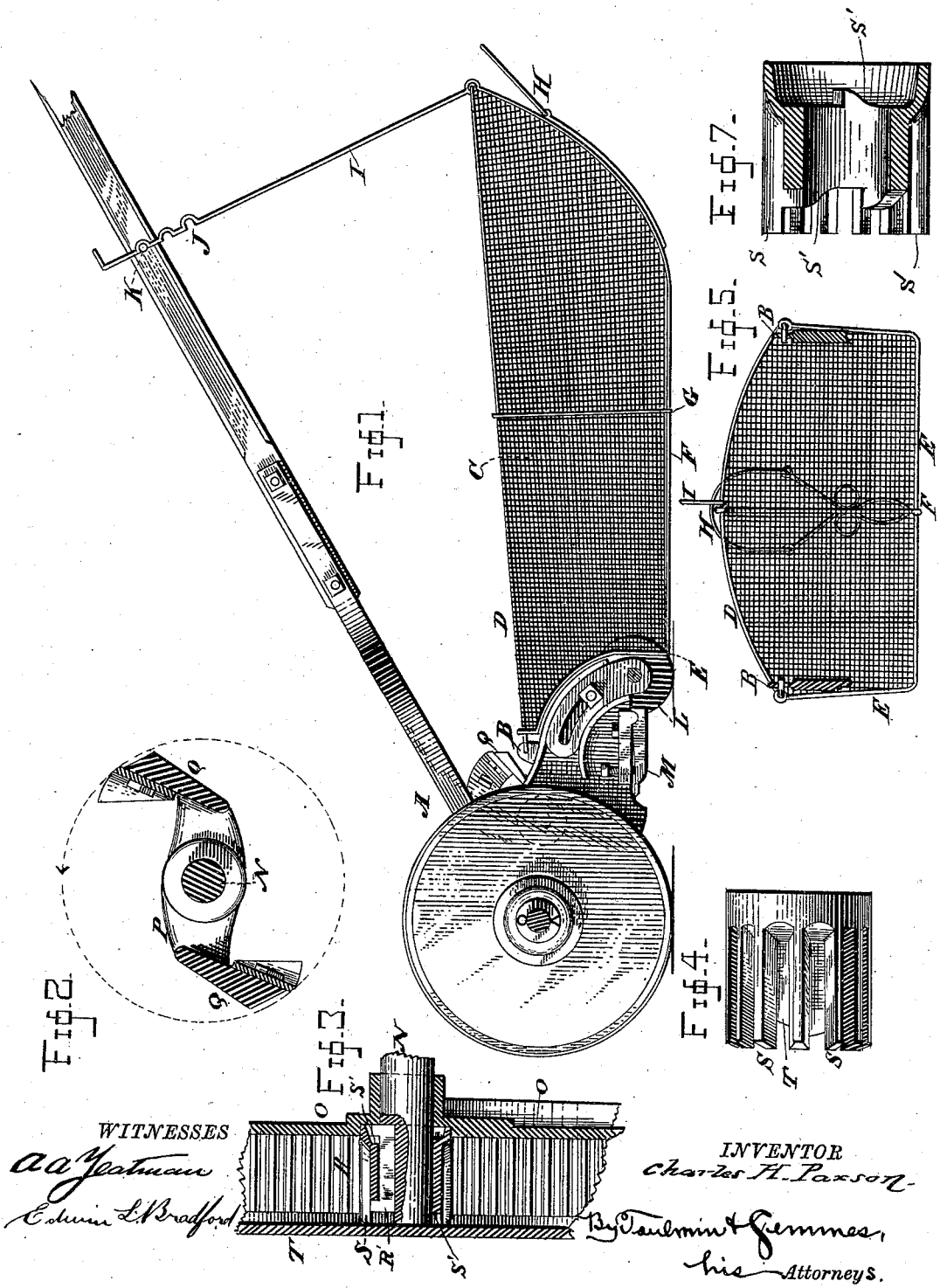

(No Model.)  
C. H. PAXSON.  
LAWN MOWER.  
2 Sheets—Sheet 2.

No. 351,791. Patented Nov. 2, 1886.

WITNESSES

INVENTOR  
Chas. H. Paxson,  
By Toulmin & Jemmes,  
Attorneys.

UNITED STATES PATENT OFFICE.

CHARLES H. PAXSON, OF SPRINGFIELD, OHIO, ASSIGNOR TO JOHN H. THOMAS, OF SAME PLACE.

LAWN-MOWER.

SPECIFICATION forming part of Letters Patent No. 351,791, dated November 2, 1886.

Application filed November 10, 1885. Serial No. 182,352. (No model.)

*To all whom it may concern:*

Be it known that I, CHARLES H. PAXSON, a citizen of the United States, residing at Springfield, in the county of Clark and State of Ohio, have invented certain new and useful Improvements in Lawn-Mowers, of which the following is a specification, reference being had therein to the accompanying drawings.

This invention relates to certain new and useful improvements in lawn-mowers, and it has for its objects, first, to provide a crate or light receptacle adapted to catch and carry the cut grass as the machine advances forward, the crate being so connected with the mower proper as to travel therewith; second, to provide the knife-reel with blade-bars, so configurated as that they will be heaviest at their outer edges, whereby the reel is more nearly made to partake of the qualities of a fly or balance wheel; and, third, to provide the clutch-pinions, which serve to gear the wheels with the reel-shaft, with projecting teeth, which serve the purpose of preventing outward longitudinal motion of the pinions.

In the accompanying drawings, forming a part of this specification, and on which like reference-letters indicate the same features, Figure 1 represents a side elevation of a lawn-mower of any approved type, and of my improved crate attached thereto; Fig. 2, a transverse enlarged sectional view of the reel-shaft, the reel-frame, and the blades; Fig. 3, a vertical sectional view of one of the wheels and the clutch mechanism, showing a part of the reel-shaft also; Fig. 4, a detached side elevation of the clutch-pinion, and Fig. 5 a front elevation of the crate detached; Fig. 6, a vertical sectional view through one of the supporting-wheels, showing the reel-shaft and pinion in cross-section; and Fig. 7, an axial sectional view of the clutch-pinion.

The letter A designates a lawn-mower of the character now generally in use, or of any approved type, save in the particulars enumerated in the second and third objects of the invention, and save in respect to the lugs B. These lugs are preferably cast integrally with the side pieces of the frame, and are provided with apertures.

The letter C designates a crate constructed, by preference, of reticulated material, as wire-gauze, and provided with a border-wire, D, which serves to strengthen it, and which is provided at its forward ends with inwardly-projecting portions, which are sprung into the apertures of the lugs B, whereby the crate is connected with the mower. The crate is also provided with a forward side and cross wire, E, and with strengthening-wires F and G, as also with a handle, H. To the rear of the crate a rod, I, is connected, the upper end, by preference, having several hooks, (or apertures,) J, which engage with the stud K, projecting from the handle, the function of the rod being to sustain the crate in different positions with respect to the handle of the machine. The crate, however, may be used without the rod I, as I have ascertained by repeated trials that it works equally well without it, as it slides along over the ground with perfect ease, being constructed with special regard to lightness. Again, the reticulated form of the crate prevents the accumulation of water (should the grass be wet) and of dirt.

It is obvious that numerous ways may be adopted for connecting the crate with the machine, and I do not therefore limit myself to the manner shown, though it is convenient and cheap.

It will be observed that the forward end of the crate fits closely to the roller L of the machine, or, where the roller is not used, it fits closely to the rear edge of the stationary knife-bar M, so as to insure the gathering of the cut grass. It is also to be observed that by the use of the crate the necessity of raking together the loose cut grass is avoided. When the crate becomes filled, the load can be dumped in a moment, either by detaching the crate or by tipping the machine over on the side, or by carrying the handle of the machine forward and beyond the wheels.

The preferred form of making the crate is that shown in the drawings, which is deeper at the rear end.

The letter N designates the knife-reel shaft, the same being mounted in the stationary disk O of the machine in the ordinary manner, and the letter P designates the knife-reel, the knife-bars Q of which are comparatively thin at the point of connection with the radial arms of the reel and along their inner edges and about half of their width, gradually becoming thicker toward their peripheral edges, at which points they are double or more the thickness of their inner edges. The result of this construction is to place the essential weight of the bars Q fartherest from the axial line about which they rotate, without lessening the strength of the bars. In operation the reel revolves at a very high speed, and it becomes a matter of some desideration to dispose the weight of the bars at the point indicated, as it materially aids in the force with which the cutting-blades meet the grass, enabling them to cut through it with less reduction of their speed, on the same principle that a lighter ball or body swung around a center will be more easily resisted by an obstructing element than will a heavier body under the same conditions.

The letter R designates a clutch mechanism, constructed, so far as concerns the formation of the interior of the pinion, the gib, and the adjacent portion of a shaft, N, in accordance with Letters Patent granted to myself and Henry Croft, Jr., September 1, 1885, No. 325,565—that is to say, the pinion revolves freely upon the shaft N in one direction while the shaft is longitudinally grooved, and a gib, R', is fitted in said groove and adapted to slide back and forth therein as the inclined portions of the ratchet-teeth, (presently to be described,) of the pinion act upon it when the mower is moved in a backward direction. Near each end the pinions are provided with a series of ratchet-teeth, S', the steep sides of which engage with the gib, and thus lock the pinion and shaft, the engagement taking place when the pinion is moved in the direction incident to the forward travel of the machine, its engagement with the teeth of one of the supporting-wheels, T, causing it to revolve, as more clearly seen in Fig. 6. The ratchet-teeth in the pinion alternate—that is to say, the steep edges of the teeth of one end stand between the steep edges of the teeth of the other end, so as to make the engagement between the pinion and the gib quicker without making the teeth too close together at either end, as would be the case if all the teeth were at one end. In the present instance, however, the device, which is called a "hub" in that patent, is a pinion, and the ends S of the teeth project beyond the clutch-surface and abut against the inner face of the outer disks of the wheels T of the machine. The object of this projection of the pinion-teeth is to prevent the pinions from playing longitudinally on the shaft.

Having thus fully described my invention, what I claim as new, and desire to secure by Letters Patent, is—

1. The combination, with a lawn-mower having perforated lugs projecting from the upper rear portion of the frame, of a crate having at its rear end a rod to be adjustably connected with the mower-handle, and constructed of wire-netting, gradually increasing toward and to a point near the rear end, and provided with border-wires at the top and bottom and transverse stiffening-wires, the upper border-wires terminating in inwardly-projecting ends which fit said lugs.

2. In a lawn-mower, the combination, with the reel-shaft, of the clutch mechanism mounted thereon, the hub of the mechanism being constructed with a pinion-like periphery, the teeth of which extend to the inner face of the wheel of the machine.

3. In a lawn-mower, a clutch-pinion having its teeth at one end projected beyond the clutch-surface.

In testimony whereof I affix my signature in presence of two witnesses.

CHAS. H. PAXSON.

Witnesses:
  A. A. YEATMAN,
  EDWIN L. BRADFORD.